(12) United States Patent
Wetjens et al.

(10) Patent No.: US 8,361,212 B2
(45) Date of Patent: Jan. 29, 2013

(54) RADIATION CURABLE INK JET INK AND A METHOD FOR PRINTING A SUBSTRATE WITH THIS INK

(75) Inventors: Peter M. A. Wetjens, Sevenum (NL); Gerardus C. P. Vercoulen, Velden (NL); Hendrik J. Ogrinc, Velden (NL); Ronald J. H. M. C. Pelzers, Horn (NL)

(73) Assignee: OCE-Technologies B.V., Venlo (NL)

( * ) Notice: Subject to any disclaimer, the term of this patent is extended or adjusted under 35 U.S.C. 154(b) by 1304 days.

(21) Appl. No.: 11/991,147

(22) PCT Filed: Aug. 21, 2006

(86) PCT No.: PCT/EP2006/065502
§ 371 (c)(1),
(2), (4) Date: Feb. 28, 2008

(87) PCT Pub. No.: WO2007/025893
PCT Pub. Date: Mar. 8, 2007

(65) Prior Publication Data
US 2009/0246403 A1  Oct. 1, 2009

(30) Foreign Application Priority Data

Sep. 1, 2005  (EP) ..................................... 05107997

(51) Int. Cl.
*C09D 11/00* (2006.01)

(52) U.S. Cl. ................ 106/31.61; 106/31.13; 106/31.29; 427/541; 427/553

(58) Field of Classification Search .................. 427/541, 427/553; 106/31.13, 31.29, 31.61
See application file for complete search history.

(56) References Cited

U.S. PATENT DOCUMENTS

| | | | |
|---|---|---|---|
| 2003/0149130 A1* | 8/2003 | Kondo | 523/160 |
| 2004/0132862 A1 | 7/2004 | Woudenberg | |
| 2005/0159501 A1* | 7/2005 | Kiefer-Liptak | 522/71 |

FOREIGN PATENT DOCUMENTS

| | | |
|---|---|---|
| EP | 1 090 079 B1 | 12/2005 |
| WO | WO-99/54416 A1 | 10/1999 |
| WO | WO-03/029366 A1 | 4/2003 |

* cited by examiner

*Primary Examiner* — Robert S Walters, Jr.
(74) *Attorney, Agent, or Firm* — Birch, Stewart, Kolasch & Birch, LLP

(57) ABSTRACT

A radiation curable hot melt inkjet ink and associated printing method which includes a carrier composition that contains one or more radiation curable compounds and an agent that is able to reversibly gel the carrier composition, which agent is soluble in the carrier composition at a jetting temperature of the ink and creates the gelled carrier at a temperature below the jetting temperature, wherein the gelled carrier composition is a thixotropic composition which has a recovery time of more than 60 seconds after the gel has been mechanically disturbed to lower it's viscosity.

19 Claims, 5 Drawing Sheets

RADIATION CURABLE INK JET INK AND A METHOD FOR PRINTING A SUBSTRATE WITH THIS INK

BACKGROUND OF THE INVENTION

The present invention relates to a radiation curable hot melt inkjet ink, comprising a carrier composition that comprises one or more radiation curable compounds and an agent that is able to reversibly gel the carrier composition, which agent is soluble in the carrier composition at the jetting temperature of the ink and creates the gelled carrier at a temperature below the jetting temperature. The present invention also pertains to a method of printing a substrate with such an ink.

Such an ink is known from European patent EP 1,090.079. The inks disclosed in this patent are thixotropic pastes, wherein the thixotropic properties are provided for by adding a thickener to the carrier composition that thermally, reversibly gels this composition. In the gelled state, an elastic network of the thickener is formed in the liquid carrier composition, the interstices of the network being filled with the carrier composition. In this way, at ambient conditions, the ink is a pasty gel which prevents inter droplet smear (also called "colour bleed") of ink droplets printed next to each other on a substrate. By heating the gel, the viscosity can be decreased to become sufficiently low for jetting purposes, typically lower than 20 mPa·s. By heating the gel, the gel network will eventually break down, for example because the gel agent dissolves in the carrier composition. Since the inkjet ink is a gel at ambient conditions and becomes liquid by increasing the temperature, this ink can be regarded as a hot melt ink. Whereas the known inks provide a solution to the problem of inter droplet smear, the applicant has recognized that these inks often immediately set on the surface of the recording medium without sufficiently entering this medium, even if highly porous media such as plain paper are being used. This results, i.e., in the effect that the jetted ink droplets actually protrude from the surface of the recording medium, thereby providing a matte appearance instead of a glossy appearance.

SUMMARY OF THE INVENTION

It is an object of the present invention to overcome or at least mitigate the above-identified problem. To this end, an ink has been invented wherein the gelled carrier composition is a thixotropic composition which has a recovery time of more than 60 seconds after the gel has been mechanically disturbed to stepwise lower its viscosity. Known inks, at a temperature of 20° C., have a viscosity of at least 500 mPa·s at a shear rate of $20\ s^{-1}$, and at the same temperature at a shear rate of $1000\ s^{-1}$ their viscosity is no more than 300 mPa·s. Moreover, after application of shear at a shear rate of $1000\ s^{-1}$ for 60 seconds, the recovery time for recovery of the viscosity at $20\ s^{-1}$ to return to the same value or higher as originally measured at that shear is no more than 60 seconds. The inks according to the present invention however, under the same circumstances, have a recovery time of more than 60 seconds. It has been seen that with these inks the problem of immediate setting of the inks on the surface of a recording medium can at least be mitigated, or depending on the type of substrate, completely overcome.

At present it is not completely clear why the inks according to the present invention overcome the problem of the prior art inks. It may be that a fast recovery time corresponds to a more elastic behavior of the gelled system, thus leading to a different flow behavior when compared to inks having a less elastic, more viscous behavior. Without being bound to theory, it is believed that under dynamic mechanical conditions such as impact of an ink droplet on a substrate, a gelled system that is more elastic will have less tendency to migrate into a porous medium than a system which is less elastic.

In one embodiment of the hot melt, the gelled carrier composition has a viscosity at 20° C. of less than 10 Pa·s at a shear rate of $20\ s^{-1}$. It has been recognized that at higher viscosities, the advantages of the present invention cannot readily be realized. However, it has also been recognised that the said viscosity is preferably more than 100 mPa·s since otherwise the problem of inter color bleed may arise.

In another embodiment of the ink according to the present invention, the gelling agent comprises molecules with a weight-averaged molecular weight of less than 5000, in particular less than 1000, preferably less than 500. The addition of a small quantity of well known, high-molecular gelling agents such as carragenan, laminarane, pectin and gums such as arabic, xanthane and guar gums may lead to an unacceptably high viscosity at the jetting temperature of the ink (i.e., the operating temperature of the print head), which means that there is an adverse effect on the jetting properties of the ink. Oligomer gelling agents, i.e., gelling agents with a molecular weight less than 5000 are therefore preferably used, so that the gelling agent does not have an adverse effect on the viscosity of the ink composition. In a further preferred embodiment, low-molecular weight gelling agents are used, i.e., gelling agents with a molecular weight of less than 1,000 or even 500. The fact that these oligomer and low-molecular compounds can have gelling properties despite their relatively low molecular weight can be explained as follows. In the case of an oligomer and low-molecular gelling agents, the molecules of this agent are believed to separate from the carrier composition on an adequate reduction of the temperature, and form long compound chains via mutual (typical non-covalent) interactions, said chains possibly behaving in the same way as the high-molecular weight polymers in the previously mentioned well known gelling agents. When the gel is heated up, the interactions between the molecules of the gelling agent are interrupted and a solution (here-after also called sol) re-forms. A supplementary advantage of the use of oligomers and low molecular gelling agents is that the gel-sol transition takes place relatively quickly, because for this transition it is only necessary to break the relatively weak non-covalent bonds between the compound molecules of the polymer chains. In addition, small molecules will dissolve homogeneously in the carrier composition more rapidly.

In one embodiment the ink comprises less than 10%, preferably less than 5% by weight of the gelling agent. This has the advantage that the agent itself is of less influence on the properties, in particular the mechanical properties, of the ultimately cured ink. This is even more important when the gelling agent is radiation curable itself.

The present invention also pertains to a method for printing a substrate with a radiation curable ink as described above, comprising providing the substrate on a support, providing an inkjet print head at an operating temperature, jetting droplets of the curable ink from the inkjet print head onto the substrate, controlling the interaction between the ink and the substrate, and then curing the ink received on the substrate by directing radiation toward the substrate.

This method relies on the use of an agent that is able to gel the carrier composition of the radiation curable ink, but which gelling agent induces a recovery time of more than 60 seconds as defined above. Gelling the carrier composition in fact means that the agent thickens the carrier composition by forming a three-dimensional elastic structure therein. The carrier composition is then considered as being a gel. It appears that by gelling the carrier composition of the ink, the interaction with the substrate is dominated by the spreading behavior of the ink as such. In other words, the type of substrate appears to be only of very minor importance for the ultimately acquired dot gain. Surprisingly it further appears that the type of ink (actually the type of carrier composition) is also of minor importance in the spreading behavior. It has been found that once the ink is gelled, it is the gel-structure that, in fact, dominates the spreading behavior. This leads to the very favorable result that ink as well as substrate characteristics no longer dominate the ultimately acquired dot gain.

A gelling agent in general can consist inter alia of high and low molecular weight compounds, a mixture of compounds, or of discrete particles. The molecules or particles of the gelling agent so interact with one another that a network is formed in the carrier composition. During this network formation, it is, in principal not necessary for the molecules or particles of which the gelling agent consists, to be actually chemically bonded or have physical contact. All that is required is that they should have a physical interaction such as to result in a reinforcing effect in the liquid. As a result, the viscosity of the liquid increases without it passing over into an actual solid phase. It is noted that it cannot be unambiguously determined beforehand whether a compound can serve as a gelling agent in a carrier composition, let alone whether a compound provides a more elastic gelled system (i.e., a gelled system as known from the prior art) or a more viscous gelled system (according to the present invention). This depends, i.e., on the interactions between the gelling agent and the carrier composition. Whether an agent can gel a carrier composition can be determined by experiment, for example by analytical measurement, for example analogous to the method as described in U.S. Pat. No. 6,471,758 (column 8, line 35 to column 9, line 59; with reference to FIGS. 1 to 3). In example 6 of the present patent, it is described as to how the thixotropic behavior of the inks according to the present invention can be determined.

One of the important features of the present invention makes use of a gelling agent that is soluble in the carrier composition at the operating temperature of the inkjet print head. It is believed that this feature contributes significantly to the stability of the ink in the inkjet print head at operating temperatures. In general, if the gelling agent forms a second phase in the ink at the operating temperature, this gives rise to unstable and unpredictable processes when printing the ink from an inkjet print head, which typically has multiple miniaturized ink chambers for jetting the ink droplets. In particular, if the gelling agent consists of insoluble particles, there is a tendency of these particles to coagulate and clog the print head ink chambers. According to the present invention, the gelling agent is soluble in the carrier composition at the operating temperature of the print head and gels the ink when it is received on the substrate.

Another important aspect of the present invention is that the gelling agent gels the ink reversibly. Since in ink jet printing the ink might stay in the print head for a relatively long period, during which the print head is brought several times to its operating temperature (for example every morning at start up), the gel structure that might arise in the ink when the printer is turned off, must be broken when the print head is brought back to its operating state.

It is noted from U.S. Pat. No. 6,467,897 that a radiation curable ink is known containing a thickening agent. This ink, however, comprises 10-20% of particulate matter that acts as the thickening agent. This ink is therefore substantially unsuitable for inkjet printing. From U.S. Pat. No. 6,605,652 it is known that a gelling agent can be added to a UV-curable ink. However, it is not known from this patent that the gelling agent should be soluble in the carrier composition at the operating temperature of the print head, nor that the gelling agent has to be able to reversibly gel the ink in order to be practically suitable for inkjet printing.

In an embodiment of the method according to the present invention, the substrate is provided on a support at a first temperature below the operating temperature of the print head. In this embodiment the print head itself is operated at a temperature above the substrate temperature (typical room-temperature). This has the advantage that inks can be used that have a relatively large viscosity at room temperature. The inks namely are heated to the operating temperature upon which their viscosity is decreased to enable the drop formation process in the ink jet print head. The relatively large viscosity at room temperature means that there is a further increase in the viscosity of the ink, next to the gelling effect, when the ink is received on the cooler substrate. This further decreases the influence of ink and substrate characteristics on the acquired dot gain.

In a further embodiment, the difference between the first temperature and the operating temperature is at least 30 degrees Celsius. It surprisingly appears that when the difference is over 30° C., there is a remarkably larger choice of suitable gelling agents that are soluble in the carrier composition at the operating temperature of the print head. Next to this, the large difference in temperature enables the use of carrier compositions that comprise radiation curable compounds of relatively large molecular weight. Large compounds are inherently less dangerous to the health of people than small molecular weight compounds. Small molecular weight compounds are more volatile and can more easily pass into the body of humans. The higher operating temperature provides a low operating viscosity, even when the ink comprises relatively large molecules. Additionally, the gelling process appears to be very fast in this embodiment.

In another embodiment, the ink received on the substrate is subjected to a physical treatment before it is cured. In this embodiment the ink is physically treated between the moment of impact on the substrate and its curing by the influence of radiation. This provides for an opportunity to fine tune the spread of the ink before it is actually cured. Different levels of spread are for example needed depending on the use of the printed image. This embodiment enables the influence of dot gain without the need of changing the amount or type of gelling agent in the ink. Preferably, the physical treatment comprises the transfer of heat and/or the application of pressure. It appears that the use of heat or pressure or both (for example by using a fuser roller well known in the art of printing) adequately enables one to fine-tune the dot gain.

In a further embodiment, the print head is scanned over the substrate on a scanning carriage, and the ink of a predetermined area of the substrate is not cured until the scanning of the said area of the substrate is completed. The use of a gelling agent enables the complete printing of an area of the substrate with the ink, without the need of intermediate curing. This has a very important advantage. In the prior art namely, intermediate curing between different print stages is often applied to prevent the ink from spreading too much over and in the substrate. This means however that some ink droplets are jetted on already cured ink droplets, whereas others are jetted on not yet cured ink droplets. This gives rise to local differences in the appearance of the printed image, i.e., caused by different degrees of coalescence of the droplets, which is very disturbing when high quality images are desired. In the present embodiment, the interaction between printed (but not yet cured) ink droplets is consistent over the whole substrate since newly jetted ink droplets are always neighbored by the same type of gelled, but uncured ink droplets. This greatly improves the print quality that can be achieved by jetting radiation curable inks. In a preferred embodiment the radiation is distributed from a source that is mounted separately from the print head. This avoids the need of scanning the radiation source together with the print head.

In a still further embodiment, an uncured gelled carrier composition de-gels at room temperature. In this embodiment, the gelling agent is chosen such that at room temperature, a gelled but uncured ink slowly de-gels. This has the advantage that the ink, on its way from the factory to the client will not stay in a gelled state. Such a gelled state namely means that the ink is very viscous, which means that there are less ways of getting the ink out of its container into the printing machine. A slow transformation in to a normal liquid state at room temperature practically ensures that the ink is ungelled when it arrives at a printer for refilling purposes. Since the process of de-gelling is slow, typically taking from a few hours to several days, the gelling action is still adequate for providing control of the interaction between ink and substrate during the printing process. Thus, the advantages of the present invention are fully preserved in this embodiment.

BRIEF DESCRIPTION OF THE DRAWINGS

The present invention will now be explained in more detail in connection with the following figures and examples, wherein.

DETAILED DESCRIPTION OF THE INVENTION

Figure 1:
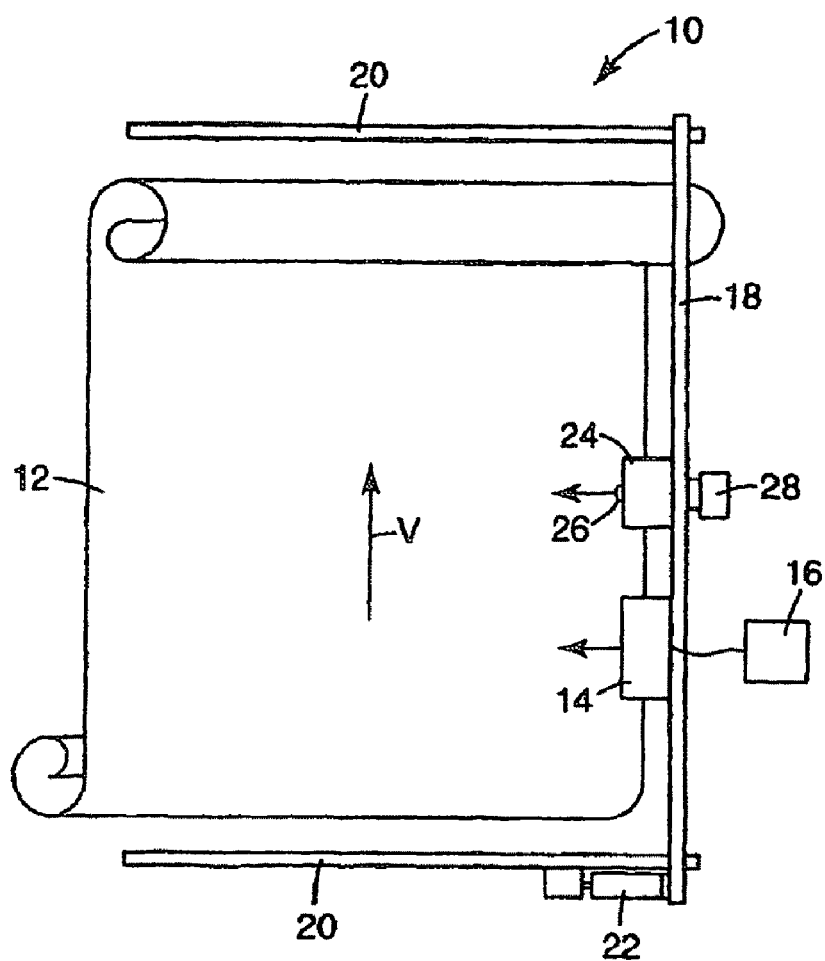
FIG. 1 is a schematic, perspective view showing a portion of a prior art inkjet printing apparatus, wherein the apparatus in this instance is a roll-to-roll vertical inkjet printer.

FIG. 1 illustrates certain components of a prior art inkjet printing apparatus using radiation curable inks. This apparatus has been extensively described in EP 1 349 733 in paragraphs [0021] to [0043] which paragraphs are incorporated completely herein by reference. This apparatus comprises a vertical support plate behind substrate 12, which substrate moves in the upward direction V. An inkjet print head 14 extends across the plate and is operable to direct radiation curable ink such as ultraviolet (UV) curable ink onto the substrate as it moves across the plate. In practice, the print head 14 is operable to print at least four inks of different colors so that a wide color spectrum in the final printed image can be obtained.

The print head 14 is coupled to a controller 16 for selective activation when desired. Controller 16 also controls the movement of the substrate drive system (not shown). The print head 14 is mounted on a carriage 18 which is movable in horizontal direction across the width of the substrate to print a row of dots of the desired image. The carriage 18 is movable along two rails 20 that extend in parallel in horizontal directions. A stepping motor 22 is operable to shift the carriage 18 along the rails 20. Motor 22 is connected to controller 16 for timed, selective activation of the motor 22 as may be needed. A curing device 24 is also mounted on the carriage 18. The curing device 24 includes one or more sources of radiation, each of which is able to emit light in the ultraviolet spectrum. Suitable sources are for example mercury and xenon lamps, carbon arc lamps, tungsten filament lamps, lasers, LED's and the like. In this particular embodiment the curing device includes one single UV lamp 26. The curing device includes a shield (not shown) that extends substantially over lamp 26 in order to ensure that only the portion of the substrate that lies directly beneath the lamp is irradiated. The curing device is connected to controller 16 and is mounted on the carriage for movement in vertical direction. Stepping motor 28 is connected to curing device 24 for moving the latter in a direction either away from or towards the print head 14. Controller 16 includes a computer for determining a desired dwell time for the ink received on the substrate, based on characteristics of the ink and substrate used. This dwell time represents the time interval between the time that the ink is received on the substrate 12 and the time that the substrate receives radiation from curing device 24. Once the desired dwell time is calculated, motor 28 is energized as necessary to shift the curing device 24 either towards or away from the print head 14. As an alternative, the dwell time may be varied by changing the speed of advancement of substrate 12. In this embodiment, motor 28 is not needed. The disadvantage of this embodiment is that the output speed of the apparatus depends on the particular ink-substrate combination.

Figure 2:
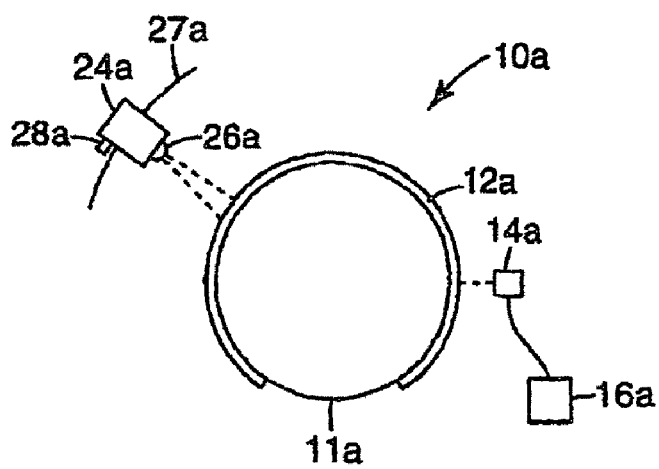
FIG. 2 is a schematic end elevational view of another prior art inkjet printing apparatus, wherein the apparatus in this instance is a rotatable drum inkjet printer.

FIG. 2 illustrates a prior art printing apparatus 10a, which comprises a rotatable drum 11a. This drum is rotatable around a central horizontal reference axis. The drum 11a is coupled to a transport system for moving it around its axis, wherein the rotation is controlled by using controller 16a. A substrate 12a is received over the external surface of drum 11a. The apparatus also includes a print head 14a for jetting radiation curable ink. The apparatus 10a includes a curing device 24a for directing UV radiation towards ink that is received on the substrate 12a. Lamp 26a of the curing device is connected to controller 16a for activation and deactivation as needed. The curing device 24a is coupled to a pair of guide rails 27a, one of which is shown in FIG. 2. The rails extend in an arc about the rotational axis of the drum 11a. A motor 28a is operably connected to the curing device 24a and the rails 27a for moving the curing device 24a along the rails 27a as desired. The motor 28a is also connected to the controller for operation.

As can be appreciated by reference to FIG. 2, the motor 28a is operable to move the UV lamp 26a in directions either towards or away from the print head 14a. As such, the dwell time of the ink received on the substrate 12a can be varied by operation of motor 28a. Alternatively, the dwell time may be varied by changing the start and stop times of the rotational movement of the drum 11a.

Figure 3:
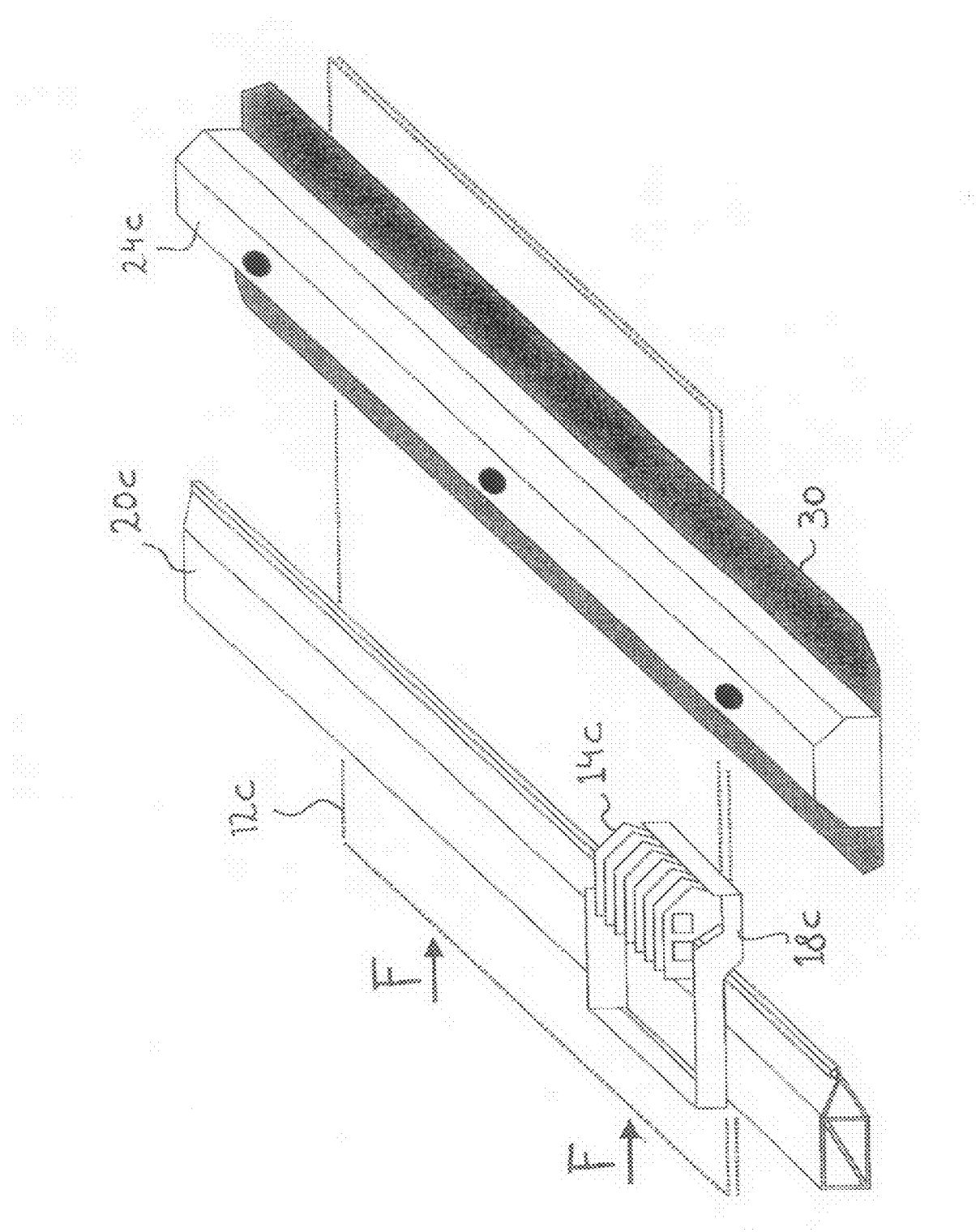
FIG. 3 is a schematic, perspective view showing a portion of an inkjet printing apparatus suitable for application to the present invention, wherein the apparatus in this instance is a flatbed inkjet printer.

FIG. 3 illustrates certain components of an inkjet printing apparatus using radiation curable inks according to the present invention. In this embodiment the printer is a flat-bed printer, capable of printing a large flat panel 12c. The printer comprises a carriage 18c that is guided on a rail system 20c for reciprocal movement in a direction substantially perpendicular to the direction F. Carriage 18c is provided with eight print heads 14c, each comprising a different color, in this embodiment, viz. cyan, magenta, yellow and black as well as diluted versions of each of these colors.

Upon printing an image on the panel 12c, the carriage is reciprocally moved over the guide rail 20c in order to provide one strip of the panel with rows of ink droplets. In this case, the complete image as intended for this strip is printed. Since the ink contains an agent that gels the ink droplets as soon as they are received on the substrate, they do not adversely coagulate, spread or bleed into the panel 12c. After printing of the said strip is completed, the panel is moved in the direction F such that a next strip neighboring the strip that has just been printed faces the print heads 14c. Then, the next strip of panel 12c is printed with ink droplets. The printer is provided with a curing device 24c, which comprises several lamps (not shown) that emit light in the ultraviolet spectrum towards the panel 12c. The curing device is shown with shields 30 that prevent the UV light from being scattered over the panel to its surroundings, in particular to the print heads. When a printed strip with uncured ink passes underneath the curing device 24c, radiation is emitted towards the panel, sufficient for curing the ink located on that strip. Curing device 24c is a stationary device that is not movable with respect to the guide rail 20c. The dwell time of the ink droplets is therefore substantially the same for all droplets.

Figure 4:
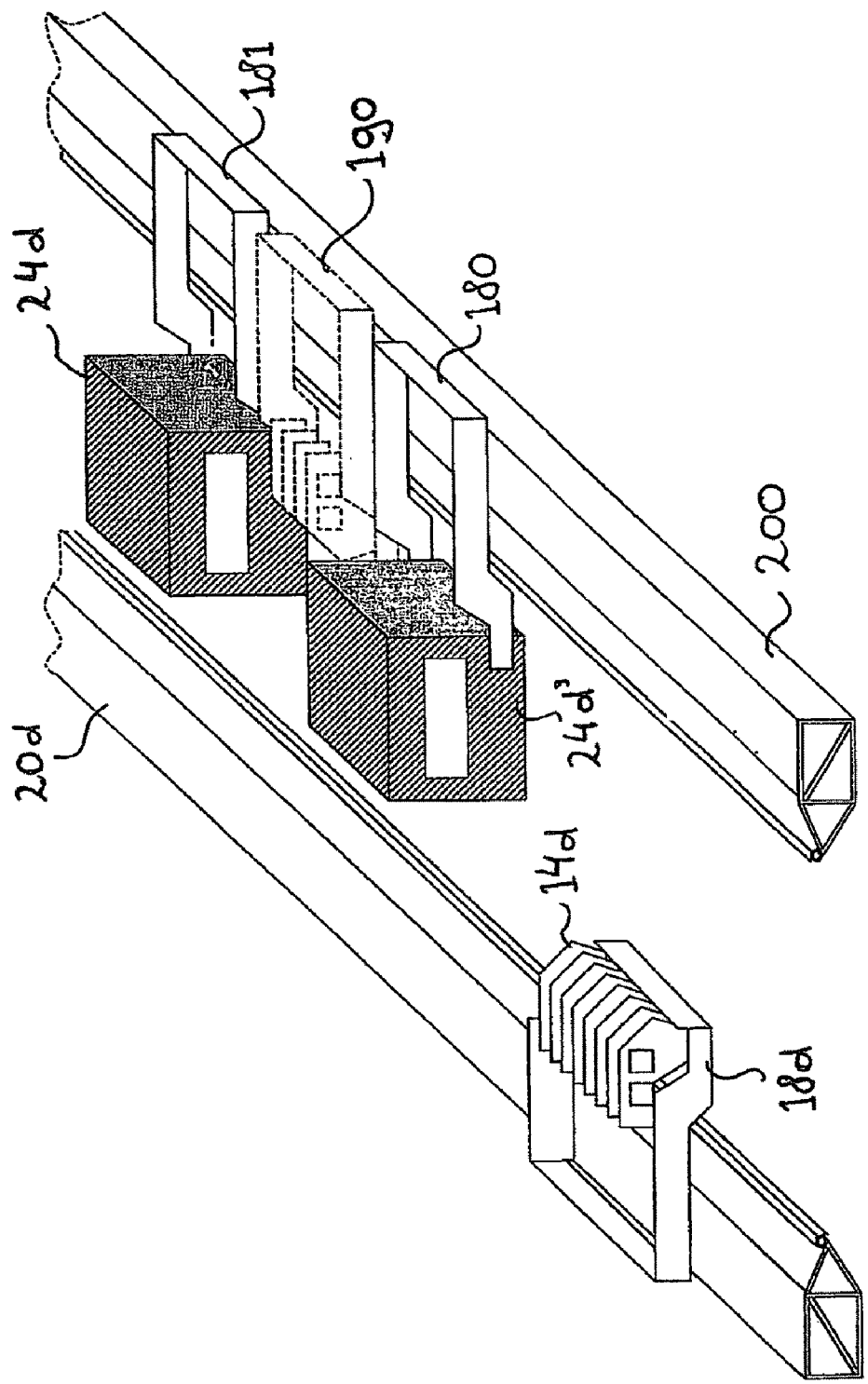
FIG. 4 is a schematic, perspective view showing a portion of another inkjet printing apparatus suitable for application to the present invention.

FIG. 4 illustrates a second type of a printer which can make use of the inks and method according to the present invention. The most relevant parts of the printer are depicted in FIG. 4. This printer is provided with a carriage 18d that is provided with eight print heads 14d, the carriage being connected to guide rail 20d for reciprocal movement across a substrate (not shown). This is the same constitution as the printer according to FIG. 3. The printer comprises a second guide rail 200. To this guide rail carriages 180 and 181 are connected. These carriages are provided with curing devices 24d' and 24d respectively, each of the devices comprising a mercury lamp (not shown) for emitting radiation towards the substrate. The carriages can be reciprocated across the substrate by corresponding guidance over the rail 200. Optionally the printer comprises an additional carriage 190 which carries an additional print head or set of print heads that is in communication with a source of clear ink or other material that lacks color, or even colored ink. The clear ink can be used to improve performance of the finished product, such as by improving durability, gloss, resistance to graffiti and the like. The colored ink, for example white pigmented ink, might for example be used to apply spot color having a dedicated customized tone.

Radiation curable carrier compositions that constitute inks suitable for inkjet printing have been known in the prior art for some time and may comprise for example compositions based on acrylates or thiolenes, which compositions can be cured by providing radicals on emitting radiation. Other known compositions can be cured by providing cations on emitting radiation to the composition. Mixtures of various compositions are also known in the prior art. Typical radiation types that are used for curing are ultraviolet light and electron beams. UV-curing starts off with initiating a reaction by the emission of light in the ultraviolet spectrum. A photoinitiating agent absorbs the UV-light which causes, e.g., the formation of radicals or ions. Electron beam curing is based on the ability of such beams to split chemical bonds, which causes the formation of free radicals and ions. These particles in turn cause the initiating of a curing reaction. All these processes are well known in the prior art.

UV-curable inks are typically based on a carrier composition that comprises acrylate monomers and oligomers. Well known acrylates in this respect are, for example, epoxy acrylates, urethane acrylates, polyester acrylates, silicone acrylates, acrylated dendrimers, polyether acrylates and mono or multiple polyolacrylates. In general the carrier composition comprises di- (or even multiple) functional acrylates such that polymer chains (and networks) can be formed in the curing process. The compound 1,6-hexanediol-acrylate is commonly applied. Alkoxylated compounds such as 1,6-hexanediol-ethoxylate-diacrylate are also known for their use in UV-curable inks and have the advantage of being less dangerous to the health of mammals. The same is true for dimerised acrylates. It is believed that alkoxylated, dimerised acrylates are the least dangerous for one's health. Next to the acrylates, the composition generally comprises a photoinitiator. Pigments or other colorants are commonly used in these inks for enabling marking purposes. Other ingredients that are commonly known in the art of inks, such as biocides, dispersants, humectants, viscosity modifying agents, surfactants etc. can be utilized as necessary.

Next to the acrylate type radiation curable inks, inks are known that are based on epoxides, oxetanes and vinylethers such as Bisphenol A epoxides, cycloalipatic epoxides, isopolyols, alifatic-, aromatic- and alifatic-urethane vinylethers. The latter types can also be cured by using the combination of UV-light and an appropriate photoinitiator (e.g., diaryliodonium or triarylsulfonium salts) which upon absorbing the UV light generates ions. Carrier compounds used regularly are for example limoneen dioxide, bis{[1-ethyl(3-oxetanil)]methyl}ether, bis-(3-4-epoxycyclohexylmethyl)adipate, 3-ethyl-3-phenoxymethyl-oxetane, 3-ethyl-3-[(2-ethylhexyloxy)methyl]oxetane, and 3-ethyl-3-hydroxymethyl-oxetane. Photoinitiators commonly used with these compounds are Esacure 1187 and Chivacure 1172. Many photosensitizers are known for these initiators and can be found, i.e., among the anthracene-, xanthone-, thiazine-, acridine-, and porphorine-derivates. Particular compounds are for example 1, 6 diphenyl-1,3,5 hexatriene, pyrene and perylene.

Radiation curable inks for use in the present invention comprise an agent that can gel the carrier composition when the ink is received on the substrate. Here-in-below are specific examples of inks in which the present invention is embodied.

Example 1

Example 1 illustrates an ink suitable for use according to the present invention. A UV-curable ink is made that is based on a carrier composition comprising 36.5 weight % 1,6-hexanediol-ethoxylate-diacrylate (see formula 1 here-beneath), 36.5 weight % di-trimethylolpropane tetraacrylate (see formula 2), 18 weight % N-vinylcaprolactam (see formula 3) and 9 weight % of the photoinitiator, 2 para tolyl-2-(dimethylamino)-4'-morfolinobutyrofenon available (at Ciba Specialty Chemicals, Basel, Switzerland) under the tradename Irgacure 379. To this carrier composition 1.5 parts per hundred parts carrier composition (1.5 phr) carbon black is added as a marking material. This carbon black is available as Nipex 150 at Degussa AG Germany, and is dispersed using Solsperse 39000 (1 part per part carbon black) and Solsperse 5000 (1 part per 4 parts Carbon black) both available from Noveon Inc., USA with 2-butanone as the dispersing medium. Next to this 1.5 phr stearon (i.e., $(C_{17}H_{35})_2C=O$) is added as a gelling agent. Note that stearone as a compound for inkjet inks is known as such. However, in combination with this particular carrier composition, it acts as a gelling agent which is hitherto unknown. Lastly 500 ppm methoxyhydroquinon is added as an inhibitor.

Formula 1 (n = 2):

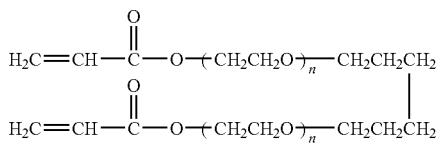

Formula 2:

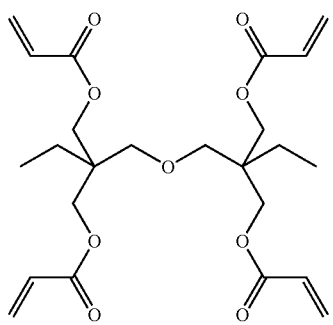

Formula 3:

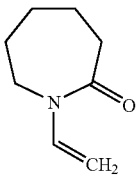

This ink can be used at an operating temperature of 70° C. (for example in the printers according to FIGS. 3 and 4), at which temperature the stearone is just dissolved in the carrier composition. If needed, some excess stearone that does not dissolve at the operating temperature can be removed by filtration before the ink is used in the inkjet printing head. If the ink is jetted onto a substrate that has a temperature of about 25° C., the ink will rapidly transform into a gelled state. This avoids too much spread, coalescence between neighboring ink droplets and bleed into the substrate. Other ink formulations based on the same carrier composition were made by using, as a gelling agent, octadecane-amide, stearylstearamide and CERIDUST™ TP 5091 (available at Clariant, Muttenz, Switzerland) (an ester of pentaeryhtrite, montanic acids and acrylic acid). The latter gelling agent is UV curable and will cure together with the carrier composition.

Example 2

Example 2 illustrates a second ink suitable for use according to the present invention. A second UV-curable ink is made that is based on a carrier composition comprising 4.9 weight % Limoneen dioxide (LDO) (available from Arkema Inc, Philadelphia, USA), 24.9 weight % Bis{[1-ethyl(3-oxetanil)] methyl}ether (available as OXT-221 from DKSH-Market Intelligence, Zurich, Switzerland), 20.0 weight % Bis-(3-4-epoxycyclohexylmethyl)adipate (available as UVR-6128 from Dow Chemicals, Horgen, Switzerland), 32.35 weight % (m/m) 3-ethyl-3-phenoxymethyl-oxetane (available as OXT-211 from DKSH-market intelligence, Zurich, Switzerland). The carrier composition further comprises 1.25 weight % Carbon black, 1.5% 2-ethyl-9,10-dimethoxy anthracene (available from Sigma-Aldrich, St.-Louis, USA), 15% Photoinitiator Chivacure 1172 (available from Double Bond Chemical, Tapei Taiwan) and 0.1% Byk UV3510 (available from Byk Chemie GmbH, Wesel, Germany). As a gelling agent 2 phr stearon is added. This ink can be used in the same way as the ink described in example 1.

Example 3

Example 3 illustrates a third ink suitable for use according to the present invention. A third UV-curable ink is made that is based on a carrier composition comprising 35.6 weight % propoxylated neopentyl glycol diacrylate (available as SR9003 from Sartomer), 26.7 weight % di-trimethylolpropane-tetra-acrylate (available as SR355 at Sartomer), 8.9 weight % of the binder according to example 2 of EP 1 367 103, 17.8 weight % of N-vinylcaprolactam (available from Sigma Aldrich), 1.5 weight % cyan pigment PB 15:3 (available as Hostacopy BG-C 101 from Clariant), 0.7 weight % TegoRad 2250 (available from Degussa), 4.0 weight % Irgacure 379 (available from Ciba Specialty Chemicals), 2.0 weight % ethyl-4-(dimethylamino)benzoate (available from Sigma Aldrich), 2.0 weight % isopropyl thioxanton (available as Speedcure ITX from Lambson), 0.05 weight % methoxy-hydroquinone (available from Sigma Aldrich) and 0.75 weight % 18-pentatriacontanone (available from Alfa Aesar).

Example 4

Example 4 illustrates a fourth ink suitable for use according to the present invention. A fourth UV-curable ink is made that is based on a carrier composition comprising 34.66 weight % di-trimethylolpropane-tetra-acrylate (available as SR355 at Sartomer), 34.66 weight % hexanediol-ethoxylate-diacrylate (available from Sigma Aldrich as art. No 497134-250 ml), 17.29 weight % isobornylacrylate (available from Signa Aldrich), 5.2 weight % chloro-4-propoxy-thioxanthone (available as Speedcure CPTX from Lambson), 5.2 weight % ethyl-4-(dimethylamino)benzoate (available from Sigma Aldrich), 0.7 weight % TegoRad 2250 (available from Degussa), 1.5 weight % Carbon Black (see here-above), 0.05 weight % of methoxyhydroquinone (available from Sigma Aldrich) and 0.74 weight % 18-pentatriacontanone (available from Alfa Aesar).

Example 5

Example 5 illustrates a fifth ink suitable for use according to the present invention. A fifth UV-curable is made that is based on a carrier composition comprising 34.6 weight % di-trimethylolpropane-tetra-acrylate (available as SR355 at Sartomer), 34.6 weight % propoxylated neopentyl glycol diacrylate (available as SR9003 from Sartomer), 17.6% isobornylacrylate (available from Signa Aldrich), 5.1 weight % chloro-4-propoxy-thioxanthone (available as Speedcure CPTX from Lambson), 5.1 weight % ethyl-4-(dimethylamino)benzoate (available from Sigma Aldrich), 0.05 weight % of methoxyhydroquinone (available from Sigma Aldrich), 1.5 weight % cyan pigment PB 15:3 (available as Hostacopy BG-C 101 from Clariant), 1.45 weight % refined cerilla (candelilla wax available from Baerlocher GmbH).

Example 6

Example 6 describes how the inks according to the present invention can be characterized theologically. In this example it is described how the inks according to the present invention can be characterized, theologically. To this end a rheometer is used available as the Anton Paar MCR 301, in this case applying the Cone-Plate Chamber CP50-2 and a Peltier temperature controller element. The ink is brought to a temperature of 70° C. (which is sufficient to dissolve the gelling agents) and maintained at this temperature for 5 minutes. Then the ink is cooled to a temperature of 20° C. When that temperature is reached a shear with a shear rate of 20 s$^{-1}$ is applied during 2 minutes. Immediately after that, a shear rate of 1000 s$^{-1}$ is applied during 1 minute. Then the ink is left to recover for 60 seconds or longer. After the recovery period, shear is applied at a rate of 20 s$^{-1}$.

Figure 5:
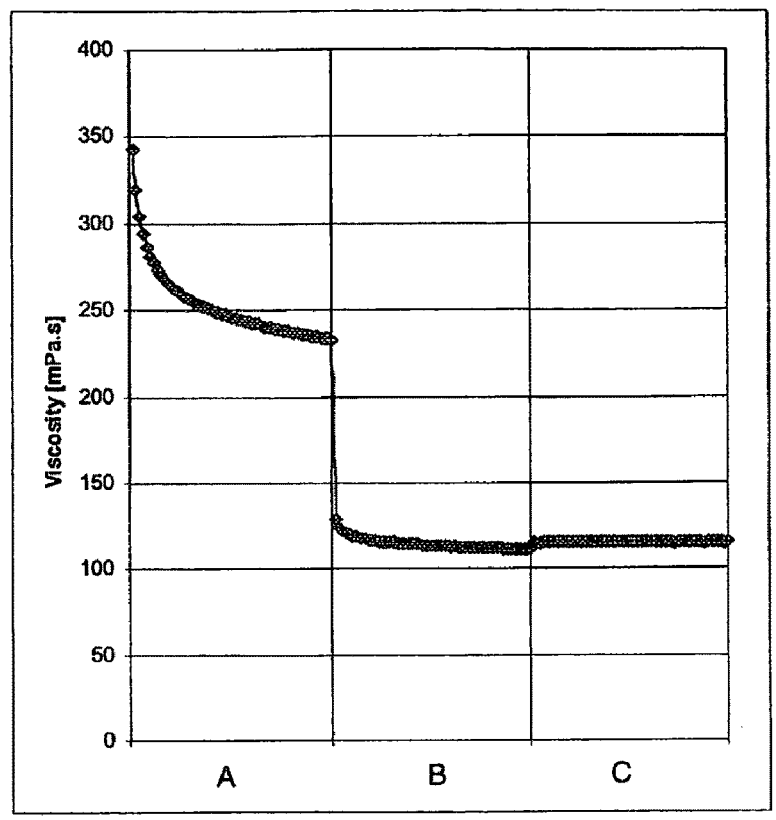
FIG. 5 shows the rheological behavior of a first ink according to the invention.
Figure 6:
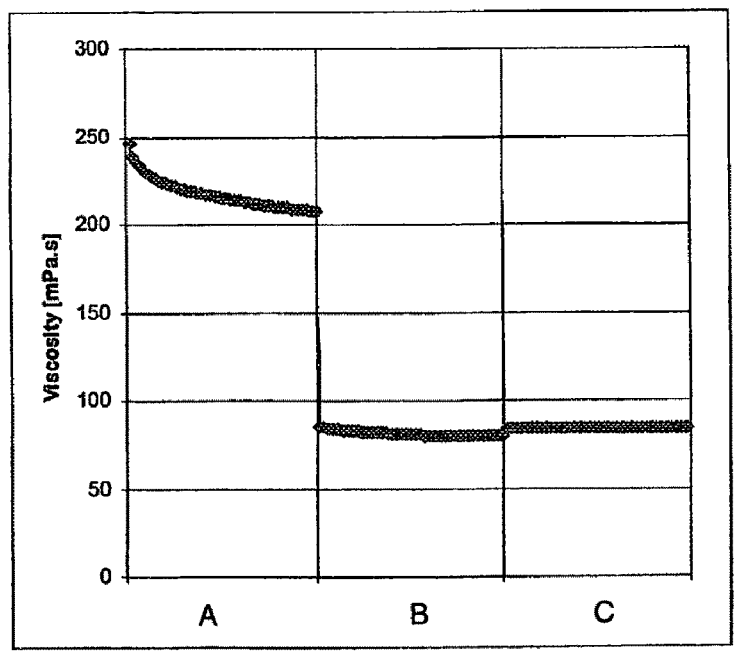
FIG. 6 shows the rheological behavior of a second ink according to the invention.
Figure 7:
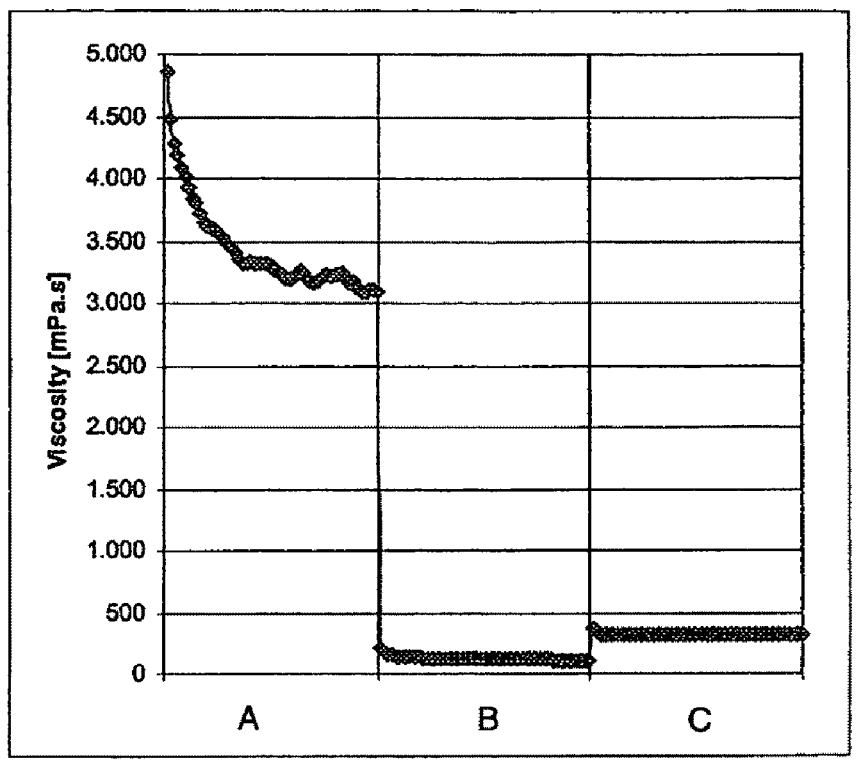
FIG. 7 shows the rheological behavior of a third ink according to the invention.

FIGS. 5 to 7 show the typical rheological behavior is of inks according to the present invention when they are subjected to the measurement cycle as described hereinabove.

FIG. 5 shows the rheological behavior of the ink according to Example 3. When this ink is subjected to shear at a rate of 20 s$^{-1}$ (period A), it initially has a viscosity of approximately 340 mPa·s which gradually decreases to about 230 mPa·s during application of that shear during 2 minutes. When a shear rate of 1000 s$^{-1}$ is applied (period B), the viscosity stepwise decreases to about 110 mPa·s. After the recovery period of 120 second, the viscosity is still approximately 110 mPa·s (period C). Thus, it is clear that the viscosity has not changed back to the same value or higher as the viscosity originally measured during the first stage, let alone that the viscosity has changed back to that value within 60 seconds. In particular, the viscosity does not even reach the same value as the viscosity at the end of this first stage (being approximately 230 mPa·s).

FIG. 6 shows the rheological behavior of the ink according to Example 4. When this ink is subjected to shear at a rate of 20 s$^{-1}$, it initially has a viscosity of approximately 245 mPa·s which gradually decreases to about 210 mPa·s during application of that shear during 2 minutes. When a shear rate of 1000 s$^{-1}$ is applied, the viscosity stepwise decreases to about 90 mPa·s and further decreases during application of that shear during 1 minute to approximately 80 mPa·s. After the recovery period of 120 second, the viscosity is approximately 85 mPa·s. Thus, the viscosity has not changed back to the same value or higher as the viscosity originally measured during the first stage, let alone that the viscosity has changed back to that value within 60 seconds. In particular, the viscosity does not even reach the same value as the viscosity at 40 the end of this first stage (being approximately 210 mPa·s).

FIG. 7 shows the rheological behavior of the ink according to Example 5. When this ink is subjected to shear at a rate of 20 s$^{-1}$, it initially has a viscosity of approximately 4800 mPa·s which gradually decreases to about 3100 mPa·s during application of that shear during 2 minutes. When a shear rate of 1000 s$^{-1}$ is applied, the viscosity stepwise decreases to about 200 mPa·s. After the recovery period of 120 second, the viscosity is approximately 300 mPa·s. Thus, it is clear that the viscosity has not changed back to the same value or higher as a viscosity originally measured during the first stage, let alone that the viscosity has changed back to that value within 60 seconds. In particular, the viscosity does not even reach the same value as the viscosity at the end of this first stage (being approximately 3100 mPa·s).

It is noted that the inks according to the present invention may have a recovery time of days, weeks, months or even years, or even an infinite time period. What is relevant is that with the inks according to the present invention, in particular under the circumstances as defined in the examples, the recovery takes more than 60 seconds.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A radiation curable hot melt inkjet ink containing a carrier composition that comprises one or more radiation curable compounds and an agent that is capable of reversibly gelling the carrier composition, which agent is soluble in the carrier composition at a jetting temperature of the ink and creates a gelled carrier composition at a temperature below the jetting temperature, said gelled carrier composition being a thixotropic composition which is a viscous gelled system having a recovery time of more than 60 seconds after the gelled carrier composition has been mechanically disturbed at a shear rate of 1000 s$^{-1}$ for 60 seconds to stepwise lower its viscosity.

2. The radiation curable hot melt inkjet ink according to claim 1, wherein the viscosity of the gelled carrier composition at 20° C. is less than 10 Pa·s at a shear rate of $20^{-s}$.

3. The radiation curable hot melt inkjet ink according to claim 2, wherein the viscosity is more than 100 mPa·s.

4. The radiation curable hot melt inkjet ink according to claim 1, wherein the gelling agent comprises molecules with a weight-averaged molecular weight of less than 5000.

5. The hot melt inkjet ink of claim 1, which comprises less than 10% by weight of the gelling agent.

6. The hot melt inkjet ink according to claim 1, wherein the gelling agent is a crystalline compound.

7. The hot melt inkjet ink according to claim 1, wherein the gelling agent is radiation curable.

8. The radiation curable hot melt inkjet ink according to claim 1, wherein the gelling agent comprises molecules with a weight-averaged molecular weight of less than 1000.

9. The radiation curable hot melt inkjet ink according to claim 1, wherein the gelling agent comprises molecules with a weight-averaged molecular weight of less than 500.

10. The hot melt inkjet ink of claim 1, which comprises less than 5% by weight of the gelling agent.

11. The radiation curable hot melt inkjet ink of claim 1, wherein the carrier composition comprises Formula 1 (n = 2):

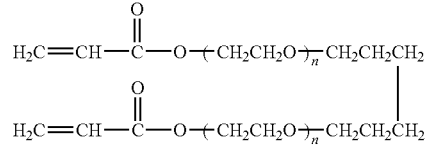

wherein n=2,

Formula 2:

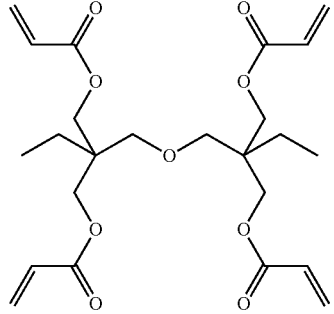

Formula 3:

and 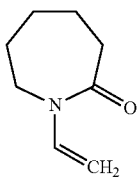

the gelling agent is at least one member selected from the group consisting of octadecane-amide; stearylstearamide; an ester of pentaeryhtrite, montanic acids and acrylic acid; and stearone [$(C_{17}H_{35})_2C=0$].

12. The radiation curable hot melt inkjet ink of claim 11, wherein the gelling agent is stearone [$(C_{17}H_{35})_2C=0$].

13. A method for printing a substrate with a radiation curable inkjet ink according to claim 1, which method comprises
providing the substrate on a support,
providing an inkjet print head at an operating temperature,
jetting droplets of the curable ink from the inkjet print head onto the substrate,
controlling the interaction between the ink and the substrate, and
curing the ink received on the substrate by directing radiation towards the substrate.

14. The method according to claim 13, wherein the substrate is provided on the support at a first temperature below the operating temperature.

15. The method according to claim 14, wherein the difference between the first temperature and the operating temperature is at least 30 degrees Celsius.

16. The method according to claim 13, wherein the ink received on the substrate is subjected to a physical treatment before it is cured.

17. The method according to claim 16, wherein the physical treatment comprises the transfer of heat and/or the application of pressure.

18. The method according to claim 13, wherein the print head is scanned over the substrate on a scanning carriage, and the ink of a predetermined area of the substrate is not cured until the scanning of the said area of the substrate is completed.

19. The method according to claim 18, wherein the radiation is applied from a source that is mounted separately from the print head.

* * * * *